Feb. 26, 1963 J. R. ANDERSON 3,079,591
MEMORY DEVICES
Filed March 27, 1959 2 Sheets-Sheet 1

INVENTOR
JOHN R. ANDERSON
BY Louis A. Kline
Albert L. Jessler, Jr.
HIS ATTORNEYS Feb. 26, 1963 J. R. ANDERSON 3,079,591

MEMORY DEVICES

Filed March 27, 1959

2 Sheets-Sheet 2

INVENTOR
JOHN R. ANDERSON

BY Louis A. Kline
Albert L. Sessler, Jr.

HIS ATTORNEYS 3,079,591
MEMORY DEVICES

John R. Anderson, Los Altos, Calif., assignor to The National Cash Register Company, Dayton, Ohio, a corporation of Maryland Filed Mar. 27, 1959, Ser. No. 802,371
4 Claims. (Cl. 340—173.2)

This invention relates to memory devices, and more particularly relates to memory devices employing bistable ferroelectric memory elements.

One of the essential elements of an electronic data processing system is a "memory" or information storage device. Since a large amount of information must commonly be stored in such a system, the cost per "bit" or element of information stored becomes of great importance. Bistable ferroelectric materials show promise for use in the storage of information because of the possibility of using such materials in connection with plating, printing, depositing, or similar techniques to fabricate packaged memory units at relatively low cost.

In the memory device of the present invention, a matrix of ferroelectric elements is provided either in the form of a plurality of individual elements or in the form of a plurality of effectively individual elemental volumes in a block of ferroelectric material. Photoconductively operated access means are provided for the ferroelectric elements, and electroluminescent means are utilized for output purposes. A number of different embodiments of the invention are disclosed. It will be seen that a memory or storage device consisting entirely of solid state elements has thus been devised, the design of which lends itself admirably to the simple and inexpensive fabrication techniques previously discussed.

Since ferroelectric materials have rectangular hysteresis characteristics, in which there are two remanent conditions of electrical charge (Q) or polarization, in which ferroelectric elements exhibit substantial charge saturation, these elements are bistable and therefore well suited for storage of information. The use of ferroelectric elements in storage matrices is known, as shown, for example, in the United States patent to John R. Anderson, No. 2,695,398, issued November 23, 1954. However, the above patent did not contemplate the use of ferroelectric elements in combination with photoconductive cells in the manner disclosed herein to provide a memory device of extremely simple yet efficient design.

A number of important advantages are achieved by the present invention. For one, complete isolation is obtained between each of the ferroelectric elements in the matrix memory. That is, no disturbing voltage will appear across unselected elements, since these essentially are in series with an open circuit. One of the past difficulties with ferroelectric matrix memories has been that individual cells would eventually walk up their hysteresis loop when subjected to long series of disturbing pulses. This fault is eliminated with this arrangement. Also, close control of storing and reading voltage amplitudes is unnecessary, since selection is no longer by coincident voltage. In addition, the connecting lead wires to the ferroelectric memory matrices can be reduced to only two instead of 2N for a matrix containing N by N elements. This greatly reduces fabrication costs and allows for closer spacing of ferroelectric storage elements. Yet another advantage is that optical techniques can be used for access, thus greatly reducing the total cost of access circuitry. For example, sequential access can be provided with one or more simple rotating disks with a single light on them impinging on successive rows and columns. Access can also be obtained by electroluminescent matrix arrays, if desired.

It is accordingly an object of this invention to provide a simple and effective memory device.

Another object is to provide a matrix memory using storage elements of ferroelectric materials which have bistable characteristics.

Another object is to provide a matrix memory utilizing a combination of ferroelectric, photoconductive, and electroluminescent elements.

An additional object is to provide a matrix memory capable of being fabricated by simple and inexpensive techniques.

A further object is to provide a memory device in which electrodes and photoconductive elements are plated or otherwise deposited upon opposite sides of a block of ferroelectric material in such manner as to provide a plurality of effective individual elemental volumes of ferroelectric material at intersections of the electrodes.

Yet another object is to provide a memory device which utilizes a combination of ferroelectric and photoconductive elements.

With these and incidental objects in view, the invention includes certain novel features of construction and combinations of parts, a preferred form or embodiment of which is hereinafter described with reference to the drawing which accompanies and forms a part of this specification.

Figure 2:
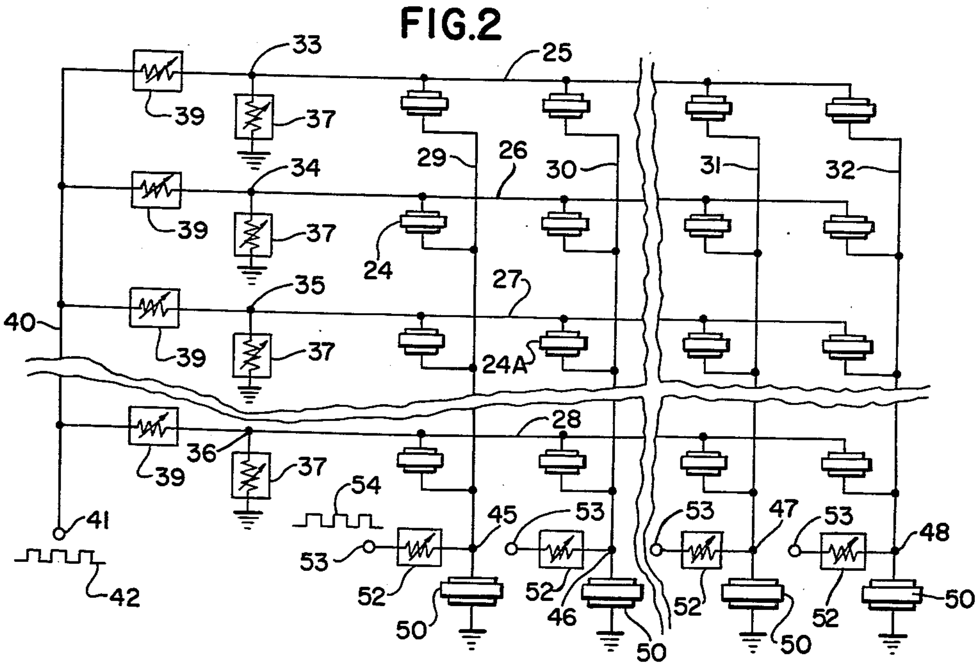
FIG. 2 is a diagram of a matrix memory circuit constructed in accordance with this invention, and utilizing electroluminescent output means and photoconductive input means.
Figure 3:
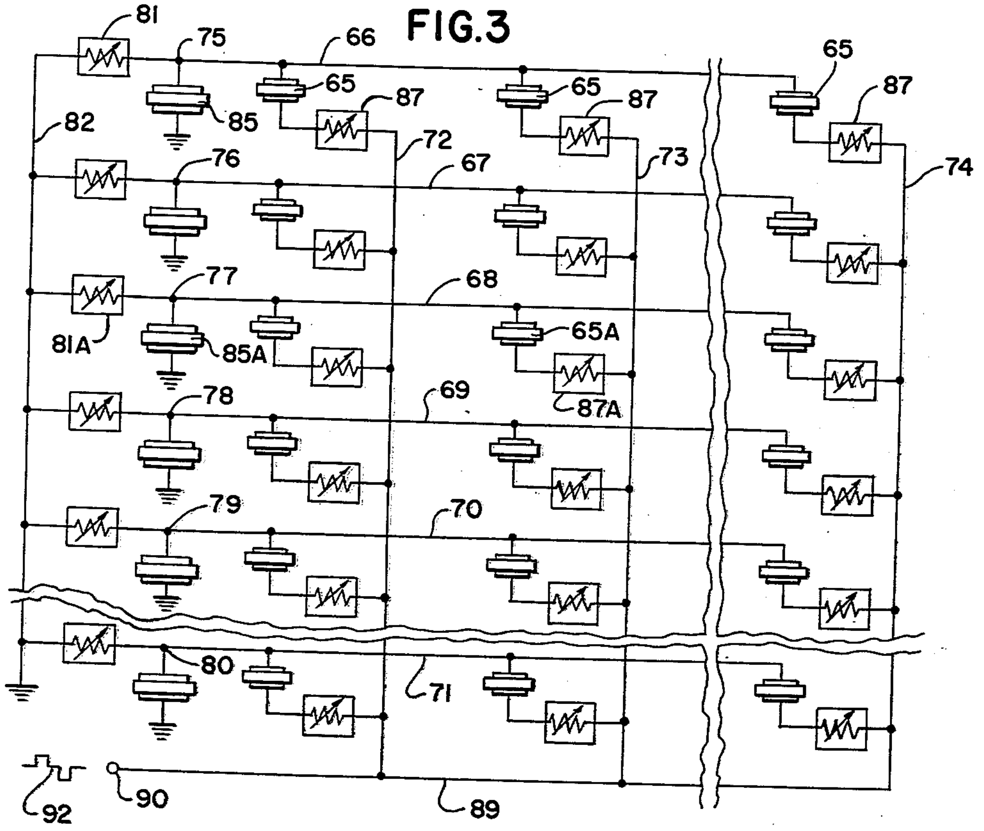
FIG. 3 is a diagram of a second embodiment of a matrix memory circuit constructed in accordance with this invention.

The ferroelectric elements utilized in the matrix memories of FIGS. 2 and 3 are shown there in the form of capacitors, with a ferroelectric material, such as barium titanate, forming the dielectric.

Barium titanate is one of a group of materials, commonly termed "ferroelectrics," which have substantially rectangular hysteresis loops. A hysteresis loop for barium titanate crystals of the type used in the present invention is illustrated in FIG. 1, where the vertical axis represents electrical displacement or degree of polarization and the horizontal axis represents the voltage applied across the terminals of the ferroelectric elements, this voltage bearing a proportional relation to the electrical field strength.

Figure 1:
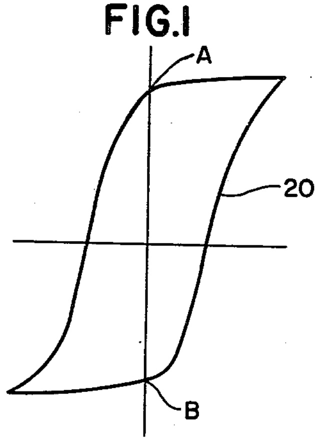
FIG. 1 is a graph showing a hysteresis loop for a ferroelectric element of the type utilized in the devices of FIGS. 2 and 3.

Points A and B on the loop 20 of FIG. 1 represent stable states of polarization, and the ferroelectric element, when placed in either of these states by application of the required electrical field across the terminals thereof, will remain in such state for a considerable period of time with all external fields removed.

All of the ferroelectric elements in a matrix memory are customarily polarized in one direction before use of the memory is commenced. Information may then be stored in the individual elements of the memory by applying voltages to the electrodes of the selected element to reverse its direction of polarization. Information which has been stored in any individual element of a matrix may be read out by applying voltages to the electrodes of said element to restore the initial direction of polarization of the ferroelectric material making up the dielectric portion of the element. This reversal of polarization will produce an output signal from the element which may be detected to determine which of the two stable states the element is in. If no information has been stored in the element, a voltage readout pulse on the electrodes of such an element will not reverse its polarization and will therefore not produce an output pulse. It is thus seen that binary information may be stored in any individual element of the matrix memory and may be read out by application of the proper signal to the selected element.

A matrix memory of the form shown in FIG. 2 may contain any desired number of ferroelectric elements, or effective ferroelectric elemental volumes in a block or slab of ferroelectric material, but is shown containing a total of sixteen ferroelectric elements arranged in four rows and four columns. Although the ferroelectric components of the matrix memory circuits of FIGS. 2 and 3 may consist either of individual ferroelectric elements, or of effectively individual elemental volumes defined by the intersection of two electrodes on opposite sides of a block or slab of ferroelectric material, for the sake of simplicity in description, these components will hereinafter be referred to as "ferroelectric elements."

Referring to FIG. 2, four horizontal rows are defined by a plurality of commons, 25, 26, 27, 28, and the four vertical columns are defined by a plurality of commons 29, 30, 31, 32. A ferroelectric element, indicated by the reference character 24, is disposed at each intersection of the commons. A first path extends from points 33, 34, 35, and 36 on the commons 25 to 28, respectively, through a photoconductive cell 37 to a terminal connected to a base reference potential, shown here as ground. A second path extends from each of the points 33 to 36 inclusive through a photoconductive cell 39 to a common 40 connected to a terminal 41 ,to which an electrical signal having a wave form such as that shown at 42 may be applied.

Points 45, 46, 47, and 48 on the commons 29, 30, 31, and 32, respectively, are each connected over a first path through an electroluminescent element 50 to a terminal connected to a base reference potential, shown in FIG. 2 as ground. The points 45 to 48 inclusive are also each connected over a second path through a photoconductive cell 52 to a terminal 53, to which an electrical signal having a wave form such as that shown at 54 may be applied.

The manner in which the matrix memory of FIG. 2 functions to store and to read out information will now be described. For the storage, or "writing," of information in the matrix, a train of pulses (positive pulses, such as shown in wave form 54, wil be used for purposes of illustration herein) is applied to the terminals 53, and the desired ferroelectric element is selected by applying an optical pulse to the photoconductive cell 37 on the horizontal common with which the selected ferroelectric element is associated, and simultaneously applying an optical pulse to the photoconductive cell 52 on the vertical common with which the selected ferroelectric element is associated.

As is well known, photoconductive materials possess the property of changing their electrical resistance in response to changes in radiation of certain wave lengths which impinge on them. One material frequently used for photoconductive cells of the type shown herein is cadmium sulfide, which has a high electrical resistance when not illuminated by radiation of suitable wave lengths, and which has a relatively low resistance when it is so illuminated. The photoconductive cells 37, 39, and 52 of the matrix memory of FIG. 2 therefore act as switches which are open when the cells are dark and which are closed when the cells are illuminated.

Any suitable source may be used for applying radiation to the photoconductive cells. For example, electroluminescent elements or neon glow tubes, operated in timed relation to the signals applied to the terminals 53, may be used.

It will be seen that by selectively applying an optical pulse to the photoconductive cell 37 of a selected one of the horizontal commons, and by simultaneously applying an optical pulse to the photoconductive cell 52 of a selected one of the vertical columns, a circuit is in effect completed through one of the ferroelectric elements 24. For example, assuming that the ferroelectric element associated with the commons 27 and 30 is selected, a circuit is completed from the terminal 53 over an illuminated photoconductive cell 52, the point 46, the common 30, the selected ferroelectric element 24A, the common 27, the point 35, and the illuminated photoconductive cell 37 to ground. The selected ferroelectric element 24A is thus switched from a first polarized state, to which it, like all of the other ferroelectric elements in the matrix memory has been initially set by appropriate use of the input means, to a second polarized state, in which it is polarized in the opposite direction. Binary information is thus stored in the element 24A. Circuits through the remaining elements 24 are blocked because one or both of the associated commons are connected to a photoconductive cell 37 or 52 in a high-resistance state, which effectively acts as an open switch.

Reading out of information stored in the matrix memory is accomplished in the following manner. A train of pulses (in the illustrated embodiment, positive pulses such as shown in the wave form 42) is applied to the terminal 41 of FIG. 2. Simultaneously, the photoconductive cell 39 associated with the horizontal row which it is desired to read out is illuminated by an optical pulse. This in effect completes the circuit from the terminal 41 over the common 40 and the photoconductive cell 39 of the selected row to the common related to the horizontal row which it is desired to read out. Pulses from the terminal 41 are thus applied to the ferroelectric elements 24 of the selected row, said pulses being applied to the ferroelectric elements in a direction opposite to the direction of application of the "writing" pulses. Application of these pulses is effective to reverse the polarization of any ferrolectric elements 24 whose polarization has been changed from the initial state of the memory to an information-storing state by "writing" or storage pulses. At the same time, the pulses from the terminal 41 will not affect the direction of polarization of the ferrolectric elements 24 in which no information has been stored. Reversal of polarization of any ferroelectric elements 24 in which information has been stored by a "writing" pulse produces a pulse on the vertical common associated with the element 24. This pulse is transmitted from the common through an electroluminescent element 50 to ground. The electroluminescent element 50, which is fabricated from a suitable electroluminescent material such as a zinc sulfide copper-halide-activated type of phosphor, is caused to glow, or emit radiation, when excited by a change in potential gradient thereacross. A detectable output means is thus provided for each vertical column of ferroelectric elements 24, so that it is possible to determine which ferroelectric elements in each row of the matrix memory have had information stored therein. With the arrangement shown in FIG. 2, it will be seen that readout of all the ferroelectric elements of a selected horizontal row takes place simultaneously when the readout pulses 42 are applied to the terminal 41.

If desired, the electroluminescent elements 50 may be used to control photoconductive cells, either in additional matrices or in other logical or output circuitry. Alternatively, the electroluminescent elements of the matrix memory of FIG. 2 may be used to provide visible indication of the information which has been stored in the memory. It is thus seen that the matrix memory of FIG. 2 provides a simple, effective, solid state device in which access and output circuitry may be electrically isolated from other components in the data-processing system.

Figure 4:
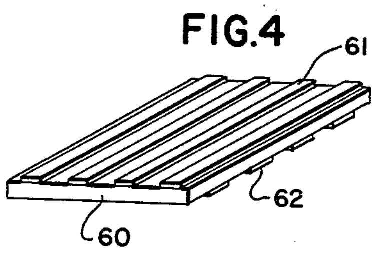
FIG. 4 is a perspective view showing one form in which electrodes may be placed upon a block of ferroelectric material to form a plurality of individual effective ferroelectric volumes for use in a matrix memory.

One possible physical arrangement of components used to form the ferroelectric matrix of FIG. 2 is shown in FIG. 4. A block or slab 60 of some suitable ferroelectric material, such as barium titanate, is provided on one side with a plurality of spaced-apart parallel elongated electrodes 61, and is provided on an opposite side with a similar plurality of parallel elongated spaced-apart electrodes 62, which are oriented transversely, here shown as at right angles, to the plurality of electrodes 61. Application of an electrical signal to a circuit which includes the electrodes 61 and 62 establishes an electrical field through the ferroelectric material at the area of intersection of the selected electrodes 61 and 62. As is well known, a field of sufficient strength through the ferroelectric material in the volume of the intersection between the selected electrodes 61 and 62 causes this elemental volume to be polarized in a direction according to the type of signal employed. Since ferroelectrics are semi-conducting materials, the electrical field is localized at the intersection, and therefore the ferroelectric material beyond the intersection is not affected. The matrix thus formed may be connected to its access and output circuitry by conventional wiring, by printed circuitry, or the access and output components may be formed either adjacent or on the ferroelectric matrix by depositing techniques such as those discussed above.

The matrix memory circuit of FIG. 3 is somewhat similar in construction and operation to the circuit of FIG. 2. This memory may also contain any desired number of memory storage units, either in the form of individual ferroelectric elements, or in the form of effective elemental ferroelectric volumes in a block or slab of ferroelectric material, the effective volumes in such case consisting of the volume of ferroelectric material at each intersection between a first plurality of electrodes on one side of the ferroelectric block, and a transversely-arranged plurality of electrodes on the other side of the block. A particular construction which may be employed to form this matrix will be subsequently described in somewhat greater detail.

For purposes of illustration, the matrix memory of FIG. 3 is shown containing eighteen ferroelectric elements 65, arranged in six horizontal rows and three vertical columns. The six horizontal rows are defined by a plurality of commons, 66, 67, 68, 69, 70, 71, and the three vertical columns are defined by a plurality of commons 72, 73, 74.

The horizontal commons 66 to 71 inclusive are connected at points 75, 76, 77, 78, 79, 80, respectively, to first paths each extending through a photoconductive cell 81 to a common 82 connected to a terminal connected in turn to a base reference potential, shown in FIG. 3 as ground. The commons 66 to 71 inclusive are also connected at points 75 to 80 inclusive to second paths, each extending through an electroluminescent element 85 to a terminal connected in turn to a base reference potential, shown in FIG. 3 as ground. Regarding the vertical common 72 to 74 inclusive, these are connected to their associated ferroelectric elements 65 through photoconductive cells 87, an individual photoconductive cell 87 being shown in association with each of the ferroelectric elements 65, although the cells 87 for a given column may in fact be elemental volumes on a single larger photoconductive cell. At one end, the commons 72 to 74 inclusive are connected to a further common 89, which is in turn connected to a terminal 90, to which an electrical signal may be applied.

As described in connection with the circuit of FIG. 2, the matrix memory of FIG. 3 is normally set prior to use, by its input means, so that all of the ferroelectric elements are in one state of polarization. Information may then be stored in the memory by reversing the direction of polarization of selected ferroelectric elements.

The manner in which the matrix memory of FIG. 3 functions to store and to read out information will now be described. For these operations, an electrical signal having a wave form such as that shown at 92 which includes both positive and negative excursions is applied to the terminal 90. In the present embodiment, the positive excursions of the wave form are used for writing information, and the negative excursions are used for readout of information, although a reverse arrangement could be used if desired.

In operation of the memory of FIG. 3, a light source is used which illuminates all of the photoconductive cells 87 in a given vertical column, in coincident timing relation to the positive pulses of the wave form 92. This may be accomplished, if desired, by utilizing the wave form 92 or an identically-timed wave form to operate an electroluminescent element which is optically coupled to all of the photoconductive cells in the selected vertical column. Also simultaneously with the positive excursions of the wave form 92, the selected one of the photoconductive cells 81 associated with the selected horizontal row common is also illuminated. A circuit is thus completed from the terminal 90 over the common 89, the selected one of the vertical commons 72 to 74 inclusive, the associated photoconductive cells 87, the ferroelectric element 65 which is associated with the row in which the selected photoconductive cell 81 has been illuminated, and the common 82, to ground. The selected ferroelectric element 65 thus has its direction of polarization reversed from the initial state to which all of the ferroelectric elements are set, so that information is thus stored in the selected element 65. For example, let it be assumed that it is desired to store binary information in the ferroelectric element 65A. By proper illumination of selected photoconductive cells, a circuit is completed from the terminal 90 over the common 89, the common 73, the photoconductive cell 87A, the ferroelectric element 65A, the common 68, the point 77, the selected photoconductive cell 81A, and the common 82 to ground, the positive pulse transmitted over this circuit being effective to reverse the direction of polarization of the ferroelectric element 65A to store binary informatioin therein. The remaining ferroelectric elements associated with the common 73 will not be switched from one polarity to the other, since completion of the circuits in which they are located to ground is blocked by the dark or unilluminated photoconductive cells 81 in said circuits. Since the electroluminescent elements 85 are also high-resistance components, though not of such high resistance as the dark photoconductive cells 81, a voltage drop across the ferroelectric elements through such a circuit results which is not sufficient to reverse the polarity of the ferroelectric elements. The electroluminescent elements 85 may be illuminated, at least to some degree, in such instances, but, since such illumination occurs during "write" time rather than "read" time, this produces no difficulty.

When it is desired to read out information stored in the matrix, the photoconductive cells 87 for the vertical column which it is desired to read out are illuminated in timing coincident with the application of a negative pulse of the wave form 92 to the terminal 90. The negative pulse causes a further reversal of the state of polarization of any ferroelectric element 65 in which information has been stored. This reversal of polarity is sufficient to cause the electroluminescent element 85 associated with the horizontal row of the selected ferroelectric element to glow, thus indicating that the selected element has had information stored therein. For example, if it is desired to read out the vertical column corresponding to the common 73, in which information has been stored in the ferroelectric element 65A, then the photoconductive cells 87 of that column are illuminated simultaneously with the application of a negative excursion of the wave form 92 to the terminal 90. A circuit is thus completed from the terminal 90 over the common 89, the common 73, the photoconductive cell 87A, the ferroelectric element 65A, the common 68, the point 77, and the electroluminescent element 85A to ground. The reversal of polarity of the ferroelectric element 65A produces an electrical pulse of sufficient strength to cause the electroluminescent element 85A to glow, thus indicating that information has been stored in the ferroelectric element 65A.

Figure 5:
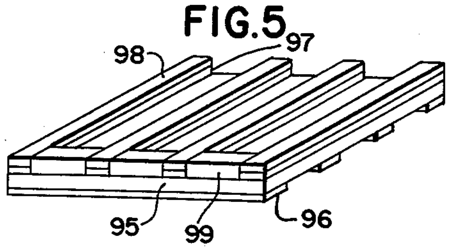
FIG. 5 is a perspective view showing both electrodes and photoconductive elements placed upon a block of ferroelectric material in such manner as to form a memory device.

One form of physical construction which may be used to implement the circuit of FIG. 3 is shown in FIG. 5. In this construction, a slab or block of ferroelectric material 95 is provided on one side with a plurality of spaced-apart elongated parallel electrodes 96, which may be located upon the ferroelectric block by any suitable means, such as vacuum vapor depositing or chemical depositing. On an opposite side of the ferroelectric block 95 are a plurality of elongated spaced-apart parallel photoconductive cells 97, which are oriented transversely, shown in FIG. 5 as at right angles, to the electrodes 96. The photoconductive cells 97 may be deposited on the ferroelectric block 95 by techniques similar to those described for the deposition of the electrodes 96. Superimposed upon the photoconductive cells 97 are a corresponding plurality of spaced-apart elongated parallel electrodes 98, which are formed of a transparent material. A common conductor 99 is deposited at one end of the ferroelectric block 95 to connect all of the photoconductive cells.

In relating the structure of FIG. 5, to the circuit of FIG. 3, it will be seen that the electrodes 96 correspond to the commons 66 to 71 inclusive; the photoconductive cells 97 correspond to the columns of the photoconductive cells 87 in the circuit of FIG. 3; the electrodes 98 correspond to the commons 72 to 74 inclusive of the circuit of FIG. 3; the conductor 99 of FIG. 5 corresponds to the common 89 of the circuit of FIG. 3; and the elemental volumes defined by the intersections of the electrodes 96 and 98 in the ferroelectric block 95 correspond to the individual ferroelectric elements 65 of the circuit of FIG. 3. The additional required access and output components for the circuit of FIG. 3 may be connected to the physical construction of FIG. 5 by conventional wiring, printed circuitry, or other appropriate means.

While the construction of FIG. 5 is not the only construction which may be utilized to implement the circuitry of FIG. 3, it does offer advantages in compactness and simplicity of fabrication. To facilitate access to the photoconductive cells by a light beam, the ferroelectric block 95 may be formed as a hollow cylinder with the photoconductive cells 97 on the interior wall. A light source may then be placed at the axis of the cylinder, with a rotating apertured mask, so that the photoconductive cells 97 are sequentially illuminated.

Although electroluminescent outputs have been shown as applied to the novel matrices, it will be clear that other outputs, using resistive or other types of circuit elements, may be employed if desired.

In the appended claims, where reference is made to ferroelectric or photoconductive elements, it should be realized that this term is intended to include both individual ferroelectric or photoconductive elements and elemental volumes of a larger ferroelectric or photoconductive block or slab.

While the forms of the invention illustrated and described herein are particularly adapted to fulfill the objects aforesaid, it is to be understood that other and further modifications within the scope of the following claims may be made without departing from the spirit of the invention.

What is claimed is:

1. An information storage device comprising, in combination, a plurality of ferroelectric elements arranged in rows and columns; a corresponding plurality of photoconductive elements arranged in rows and columns, each photoconductive element being serially coupled to a ferroelectric element to form a pair of associated elements; a plurality of conductors including a conductor coupled to all of the pairs of associated elements of each row and a conductor coupled to all of the pairs of associated elements of each column, said conductors being effective to apply electrical fields across the ferroelectric elements to polarize said elements in a given direction for the storage of information therein; and further photoconductive means associated with certain of said conductors to cooperate with the first-mentioned photoconductive elements for selecting individual ferroelectric elements for the storage of information therein.

2. An information storage device comprising, in combination, a plurality of ferroelectric elements arranged in rows and columns; a corresponding plurality of photoconductive elements arranged in rows and columns, each photoconductive element being serially coupled to a ferroelectric element to form a pair of associated elements; a plurality of conductors including a conductor coupled to all of the pairs of associated elements of each row and a conductor coupled to all of the pairs of associated elements of each column, said conductors being effective to apply electrical fields across the ferroelectric elements to polarize said elements in a given direction for the storage of information therein; further photoconductive means associated with certain of said conductors to cooperate with the first-mentioned photoconductive elements for selecting individual ferroelectric elements for the storage of information therein; and electroluminescent output means associated with certain of said conductors.

3. An information storage device comprising, in combination, a ferroelectric element having two stable states; a first plurality of elongated electrodes disposed in substantially parallel relationship on one side of the ferroelectric element in direct physical contact therewith; a plurality of elongated photoconductive elements disposed in substantially parallel relationship on an opposite side of the ferroelectric element and extending transversely of the plurality of electrodes on the opposite side of the ferroelectric element; a second plurality of elongated transparent electrodes, each being superimposed upon one of the photoconductive elements; and a common conductor electrially connecting all of the elongated photoconductive elements, whereby a plurality of effectively individual ferroelectric elements arranged in rows and colums are provided at the intersections of the first plurality of electrodes with the plurality of photoconductive elements.

4. An information storage device comprising, in combination, a bistable ferroelectric member; a first plurality of elongated electrodes disposed in substantially parallel relationship on one side of the ferroelectric member in direct physical contact therewith; a plurality of elongated photoconductive elements disposed in substantially parallel relationship on an opposite side of the ferroelectric member and extending transversely of the plurality of electrodes on the opposite side of the ferroelectric member; and a second plurality of elongated transparent electrodes, each being superimposed upon one of the photoconductive elements, whereby a plurality of effectively individual ferroelectric elements arranged in rows and columns are provided at the intersections of the first plurality of electrodes with the plurality of photoconductive elements.

References Cited in the file of this patent

UNITED STATES PATENTS

| | | |
|---|---|---|
| 2,877,376 | Orthuber | Mar. 10, 1959 |
| 2,885,656 | Wilson | May 5, 1959 |
| 2,897,399 | Garwin | July 28, 1959 |
| 2,904,626 | Rajchman | Sept. 15, 1959 |
| 2,905,830 | Kazan | Sept. 22, 1959 |
| 2,907,001 | Goebner | Sept. 29, 1959 |